US006719453B2

United States Patent
Cosman et al.

(10) Patent No.: US 6,719,453 B2
(45) Date of Patent: Apr. 13, 2004

(54) PROCESS AND DISPENSING SYSTEM FOR PREPARING LIQUID CONCENTRATES FOR PLASTICS

(75) Inventors: Jeffrey M. Cosman, St. John, IN (US); Bruce Parker, Cedar Lake, IN (US); Douglas A. Thompson, Munster, IN (US); Keith Grandbois, Dyer, IL (US); Barry Scott Walker, Whiting, IN (US); Marshall Mullins, Bourbonnais, IL (US)

(73) Assignee: Chroma Injecta Color Systems, Inc., Chicago Heights, IL (US)

( * ) Notice: Subject to any disclaimer, the term of this patent is extended or adjusted under 35 U.S.C. 154(b) by 0 days.

(21) Appl. No.: 09/884,551

(22) Filed: Jun. 18, 2001

(65) Prior Publication Data

US 2002/0036950 A1 Mar. 28, 2002

Related U.S. Application Data

(60) Provisional application No. 60/212,180, filed on Jun. 16, 2000.

(51) Int. Cl.[7] ................................................ B01F 15/04
(52) U.S. Cl. ..................... 366/141; 366/152.1; 366/348; 366/605
(58) Field of Search ............... 366/152.1, 152.2, 366/348, 189, 605, 141; 141/104; 700/285, 239; 137/3

(56) References Cited

U.S. PATENT DOCUMENTS 2,848,019 A * 8/1958 Corbin et al. ............... 366/605

(List continued on next page.)

FOREIGN PATENT DOCUMENTS

| EP | 0 391 286 A1 | 10/1990 |
| EP | 0 484 564 A1 | 5/1992 |
| EP | 0 882 496 A2 | 12/1998 |
| GB | 889 724 | 2/1962 |

*Primary Examiner*—Tony G. Soohoo
(74) *Attorney, Agent, or Firm*—Leydig, Voit, & Mayer, Ltd.

(57) ABSTRACT

The invention provides a process for preparing a liquid concentrate for use in the manufacture of plastic parts (including without limitation, as part of the sampling, evaluation and approval process before a plastic part goes into production) comprising: (a) preparing one or more liquid intermediates, wherein the liquid intermediates comprise a liquid vehicle and at least one additive (which may include a pigment, dye or other additive); (b) standardizing the liquid intermediates; (c) transferring the standardized liquid intermediates to a remote location; and (d) dispensing the liquid intermediates to produce a liquid concentrate, wherein the quantity of each liquid intermediate dispensed is controlled according to a predetermined formula for the liquid concentrate. The present invention also provides a process for preparing a liquid concentrate for use in the manufacture of plastic parts comprising: (a) providing one or more liquid intermediates, wherein the liquid intermediates comprise a liquid vehicle and at least one additive (which may include a pigment, dye or other additive), wherein the liquid intermediates are standardized, and wherein the liquid intermediates have been prepared remotely; and (b) dispensing the liquid intermediates to produce a liquid concentrate, wherein the quantity of each liquid intermediate dispensed is controlled according to a predetermined formula for the liquid concentrate. The present invention also provides a process for preparing a liquid concentrate as described above using a dispensing system which includes a dispensing machine and mixing equipment which may be controlled by a computer or operated manually at the location where the dispensing is done to produce the liquid concentrate; and which may include the manual "hand add" of one or more components of the predetermined formula before the mixing step.

21 Claims, 2 Drawing Sheets

U.S. PATENT DOCUMENTS

| | | | |
|---|---|---|---|
| 2,923,438 A | * | 2/1960 | Logan et al. ................ 366/605 |
| 3,814,388 A | * | 6/1974 | Jakob ......................... 366/348 |
| 4,225,248 A | * | 9/1980 | Para ........................... 366/605 |
| 4,403,866 A | * | 9/1983 | Falcoff et al. ............ 366/152.1 |
| 4,526,215 A | * | 7/1985 | Harrison et al. .............. 141/83 |
| 4,538,221 A | | 8/1985 | Crain et al. |
| 4,705,083 A | * | 11/1987 | Rossetti ...................... 366/605 |
| 4,733,971 A | | 3/1988 | Pratt |
| 4,813,785 A | * | 3/1989 | Miller ......................... 366/605 |
| 4,815,042 A | | 3/1989 | Pratt |
| 4,889,433 A | | 12/1989 | Pratt |
| 5,023,814 A | | 6/1991 | Guillemin |
| 5,116,547 A | * | 5/1992 | Tsukahara et al. ........... 264/1.1 |
| 5,153,825 A | * | 10/1992 | Yauk et al. .................... 705/1 |
| 5,219,224 A | | 6/1993 | Pratt |
| 5,225,210 A | * | 7/1993 | Shimoda .................. 366/151.1 |
| 5,340,211 A | | 8/1994 | Pratt |
| RE34,776 E | | 11/1994 | Pratt |
| 5,409,310 A | | 4/1995 | Owczarz |
| 5,468,068 A | * | 11/1995 | Hotchkiss, III ............. 366/605 |
| 5,522,660 A | | 6/1996 | O'Daugherty et al. |
| 5,559,173 A | * | 9/1996 | Campo et al. ............ 366/152.1 |
| 5,592,940 A | | 1/1997 | Kampfe et al. |
| 5,713,062 A | | 1/1998 | Goodman et al. |
| 5,723,517 A | * | 3/1998 | Campo et al. ............ 366/152.1 |
| 5,781,828 A | | 7/1998 | Caruthers, Jr. et al. |
| 5,800,746 A | | 9/1998 | Jones et al. |
| 5,823,670 A | * | 10/1998 | Rushing et al. .......... 366/152.1 |
| 5,833,364 A | | 11/1998 | Rushing et al. |
| 5,834,089 A | | 11/1998 | Jones et al. |
| 5,869,551 A | | 2/1999 | Caswell et al. |
| 5,889,089 A | | 3/1999 | Caswell et al. |
| 5,938,080 A | * | 8/1999 | Haaser et al. ................ 222/144 |
| 6,007,236 A | * | 12/1999 | Maguire ..................... 366/141 |
| 6,010,032 A | | 1/2000 | Vermylen et al. |
| 6,053,218 A | * | 4/2000 | Boers .......................... 141/83 |
| 6,221,145 B1 | * | 4/2001 | McClain ..................... 106/443 |
| 6,349,300 B1 | * | 2/2002 | Graf et al. ................... 707/100 |
| 6,494,608 B1 | * | 12/2002 | Retamal et al. .......... 366/152.1 |
| 6,507,824 B1 | * | 1/2003 | Yon et al. ..................... 705/26 |

* cited by examiner

PROCESS AND DISPENSING SYSTEM FOR PREPARING LIQUID CONCENTRATES FOR PLASTICS

CROSS-REFERENCE TO RELATED PATENT APPLICATIONS

This patent application claims the benefit of U.S. Provisional Patent Application No. 60/212,180, filed Jun. 16, 2000.

TECHNICAL FIELD OF THE INVENTION

This invention pertains generally to a process for preparing liquid concentrates, and more particularly to a process for preparing liquid additive and color concentrates used in the manufacture of plastic parts. The invention also relates to a dispensing system for preparing liquid concentrates for plastics.

BACKGROUND OF THE INVENTION

Liquid concentrates have been used for coloring and modifying plastic resins to produce colored or modified plastic parts. Such liquid concentrates may be added directly to a molding machine or extruder (or through a mixing process which pre-mixes the liquid concentrate with one or more resins and other materials in either a melted or solid state) to incorporate color and/or other modifiers into the plastic part. Traditionally, a plastic part manufacturer places an order with a concentrate manufacturer for a specific color or other additive concentrate. The concentrate is then prepared according to the customer's specification and shipped. In the alternative, the concentrate manufacturer may be requested to develop an appropriate formulation of the liquid concentrate to achieve the color and/or other attributes desired by the plastic part manufacturer or a customer or supplier of the plastic part manufacturer. The manufacturer will then provide samples or molded color chips or parts for evaluation and approval by the customer. This process of developing, sampling, evaluating and approving formulations followed by ordering, producing and shipping liquid concentrates can take several days and often takes several weeks.

This traditional manner for developing, sampling, evaluating and approving formulations for liquid concentrates followed by the order, production and shipping of liquid concentrates has several significant drawbacks. There is significant lead time between the time the specification for the liquid concentrate is provided to the concentrate manufacturer (whether for the concentrate itself or for the final plastic part which requires the development and approval of a formulation) and the time the order is placed for a particular liquid concentrate and when that concentrate is actually received. Plastic part manufacturers often must wait for samples (in many cases numerous successive samples) to be produced for evaluation before approval of a particular custom liquid concentrate to achieve specific color and/or additive requirements. At present, therefore, the user of the liquid concentrate must be able to accurately forecast his needs several weeks in advance and place an appropriate order for a liquid concentrate, taking into account the additional time which may be required to develop, sample, evaluate and approve the liquid concentrate which will be ordered, produced and shipped to manufacture the particular plastic parts. This requires the user to have an accurate forecast of its own customer demands for manufactured plastic parts. After concentrates are approved, because of the lead time required to receive an order, the user must carry an inventory of concentrates, each of which will have been custom formulated and not capable of being used in a wide spectrum of plastic parts of varying color or additive requirements. Such an inventory of liquid concentrates is both expensive to purchase as well as costly to warehouse. Moreover, such an inventory may become obsolete over a period of time as orders for plastic parts change.

From the foregoing, it is appreciated that there exists a need for an improved process by which a manufacturer of plastic parts can obtain liquid concentrates more quickly to satisfy changing customer order flow. This process should shorten the time required to sample, evaluate and approve a liquid concentrate and, after such approval, shorten the time required to receive that approved concentrate to produce plastic parts while, at the same time, reducing or eliminating the need to carry an extensive inventory of liquid concentrates, with attendant costs and possibility for loss. In particular, there is a need for the decentralized production of liquid concentrates so that liquid concentrate formulas can be sampled and produced promptly in response to customer demand. The present invention provides such a process.

BRIEF SUMMARY OF THE INVENTION

The invention provides a process for preparing a liquid concentrate for use in coloring or modifying manufactured plastic parts. In particular, the present inventive process for preparing a liquid concentrate comprises:

(a) preparing one or more liquid intermediates, wherein the liquid intermediates comprise a liquid vehicle and at least one pigment, dye or other additive;

(b) standardizing the liquid intermediates;

(c) transferring the standardized liquid intermediates to a remote location; and (d) dispensing the liquid intermediates to produce a liquid concentrate (which may be a liquid color concentrate, a liquid additive concentrate or a combination liquid color and additive concentrate), wherein the quantity of each liquid intermediate dispensed is controlled according to a predetermined formula for the liquid concentrate.

The present invention also provides a process for preparing a liquid concentrate for use in the manufacture of plastic parts comprising:

(a) providing one or more liquid intermediates, wherein the liquid intermediates comprise a liquid vehicle and at least one pigment, dye or other additive, wherein the liquid intermediates are standardized, and wherein the liquid intermediates have been prepared remotely; and (b) dispensing the liquid intermediates to produce a liquid concentrate, wherein the quantity of each liquid intermediate dispensed is controlled according to a predetermined formula for the liquid concentrate.

Another process for preparing a liquid concentrate according to the present invention comprises:

(a) providing a plurality of liquid intermediates, wherein the liquid intermediates comprise a liquid vehicle and at least one colorant (sometimes referred to herein as a liquid color intermediate), wherein the tint strength, color hue and viscosity of each liquid intermediate is standardized, and wherein the liquid intermediates are prepared remotely; and (b) dispensing the liquid intermediates to produce a liquid concentrate, wherein the quantity of each liquid intermediate dispensed is controlled according to a predetermined gravimetric formula for the liquid concentrate, wherein the quantity of each liquid intermediate is controlled by a computer that contains the predetermined gravimetric formula, and wherein the dispensing of the liquid intermediates is controlled by the computer.

The present invention further includes a dispensing system for preparing a liquid concentrate comprising:

(a) a plurality of containers each containing a standardized liquid intermediate prepared at a location remote from the dispensing system; and (b) a dispensing machine for dispensing one or more of the liquid intermediates to produce a liquid concentrate, wherein the quantity of each liquid intermediate dispensed is controlled according to a predetermined gravimetric formula for the liquid concentrate, wherein the quantity of each liquid intermediate is controlled by a computer that contains the predetermined gravimetric formula, and wherein the dispensing of the liquid intermediates is controlled by the computer.

The process and dispensing system of the present invention advantageously permit the production of liquid intermediates and liquid concentrates having very tight tolerances with respect to the physical characteristics of the liquid intermediates and liquid concentrates such as, for example, tint strength, color hue and viscosity. These and other advantages of the present invention, as well as additional inventive features, will be apparent from the description of the invention provided herein.

DETAILED DESCRIPTION OF THE INVENTION

The present invention provides a process and dispensing system for preparing a liquid concentrate for use in the manufacture of plastic parts. The liquid concentrate may be used to color and/or incorporate functional additives in plastic parts.

According to the process of the present invention, one or more liquid intermediates are initially prepared. Each liquid intermediate of the present invention comprises a liquid vehicle and at least one pigment, dye or other additive. Such liquid intermediates are often referred to as dispersions or suspensions. A liquid intermediate that contains at least one colorant may be referred to as a liquid color intermediate. A liquid intermediate that contains a single pigment is commonly referred to as a single pigment dispersion, monodispersion, or simply a "mono." A liquid intermediate that contains more than one pigment is routinely known as a multiple pigment dispersion. A liquid intermediate that contains at least one additive, whether a colorant or other non-colorant additive, may be referred to as a liquid additive intermediate. For purposes of this description, reference to a liquid intermediate includes a liquid color intermediate, a liquid additive intermediate, or a liquid combination color and additive intermediate. Similarly, for purposes of this description, reference to a liquid concentrate, includes a liquid color concentrate, a liquid additive concentrate or a liquid combination color and additive concentrate. The liquid intermediates useful in the present invention may be purchased in a prepared form containing both a liquid vehicle and at least one colorant or other additive. Alternatively, a manufacturer may combine a liquid vehicle with one or more colorants and other additives to prepare a liquid intermediate.

The liquid vehicle useful in the invention may be any liquid material which results in liquid intermediates and liquid concentrates having the necessary viscosity for use in the manufacture of a wide variety of plastics. Examples of suitable liquid vehicles useful in the present invention are described in U.S. Pat. Nos. 3,956,008, 4,167,503, 4,571,416, 4,624,983, 4,639,272 and 5,308,395. Suitable liquid vehicles may contain a solvent, resin, surfactant and a stabilizing agent.

Any suitable solvent may be used in the context of the liquid vehicle of the present invention. Suitable solvents include light mineral oils and light hydrocarbon oils. Preferably, the solvent is a white mineral oil such as, for example, Avatech® 80N available from Avatar Corporation (University Park, Ill.). The liquid vehicle is present in an amount sufficient to form a dispersion with the other components of the liquid intermediate and the liquid concentrate. The liquid vehicle is generally present in an amount of from about 5% to about 50% by weight of the total liquid intermediate and, preferably, in an amount of from about 5% to about 20% by weight of the total liquid concentrate.

The liquid vehicle may include a surfactant. Surfactants are used to wet-out the pigments or other additives added to the liquid intermediate and liquid concentrate which permits the pigments or other additives to be uniformly dispersed throughout the liquid intermediate and the liquid concentrate. Suitable surfactants may be nonionic, cationic, anionic or amphoteric such that high loadings of pigments and/or other additives in the liquid intermediate and the liquid concentrate may be achieved. A preferred surfactant is polyoxyethylene 20 sorbitan trioleate marketed by Uniqema (New Castle, Del.) under the tradename Tween® 85LM. Generally, the surfactant component is present in an amount of from about 5% to about 60% by weight of the total liquid intermediate and, preferably, in an amount of from about 15% to about 50% by weight of the total liquid concentrate.

The liquid vehicle may include a stabilizer. Stabilizers are employed as a thickener to enhance the solubility of the liquid intermediate and liquid concentrate and, thus, reduces the separation of the colorants and other components of the liquid intermediate and the liquid concentrate. A preferred stabilizer is trisnonylphenyl phosphite marketed by Dover Chemical Corporation (Dover, Ohio) under the tradename Doverphos® 4. Generally, the stabilizer component is present in an amount of from about 0.5% to about 8% by weight of the total liquid intermediate and, preferably, in an amount of from about 1% to about 2% by weight of the total liquid concentrate.

A desirable liquid vehicle comprising a solvent, surfactant and stabilizer generally has a Brookfield viscosity of from about 150 centipoise to about 200 centipoise or, alternatively, approximately 36 to 40 seconds in a Zahn #5 cup when measured at room temperature.

Alternatively, the liquid vehicle of the present invention may be a non-surfactant based vehicle. Suitable non-surfactant type liquid vehicles include non-volatile solvents, low molecular weight polymers and an optional dispersing aid. Non-volatile solvents such as light hydrocarbon oils and light mineral oils are suitable. Low molecular weight polymers which are useful include polybutenes, polystyrenes, polystyrene/vinyl toluene copolymers, and acrylic polymers. The liquid vehicle in this embodiment of the invention may also contain a dispersion aid, such as oleic acid. Examples of non-surfactant based liquid vehicles suitable in the present invention are described in U.S. Pat. Nos. 4,571,416 and 4,624,983. These alternative liquid vehicles comprising a light hydrocarbon oil, low molecular weight polybutenes and oleic acid generally exhibit a Brookfield viscosity of about 150 centipoise to about 200 centipoise.

The liquid intermediates of the present invention also include at least one additive. The additive may be a colorant. Suitable colorants include both pigments and dyes. The liquid intermediates of the present invention may contain other additives including, for example, optical brighteners, laser-marking additives, anti-settling agents, blowing agents, release agents, ultraviolet (UV) light absorbers, heat stabilizers, light stabilizers, antistatic agents, flame retardants, lubricants, fillers, reinforcing materials, and the like. Mixtures of two or more additives may be included in a liquid intermediate. Such mixtures may be made using only colorant additives, non-colorant additives, or mixtures of colorant and non-colorant additives.

Other additives may be included in the liquid intermediates to provide liquid concentrates and the resulting molded plastic parts with desired characteristics. For example, liquid intermediates may contain, for example, an antioxidant, a nucleating agent, a clarifying agent, an oxygen scavenger, a fragrance, a taste mask, an odor mask, a slip agent, an anti-bacterial agent, an anti-corrosive agent, a thickener, a viscosity-reducing agent, a tackifying agent, an interference pigment, a gas permeability agent, a flexibility additive, an impact modifier, a heat stabilizing agent, a defoamer, a plasticizer, an anti-blocking agent, an anti-fogging agent, an acid neutralizer, a smoke suppressor, and the like. A liquid intermediate may contain mixtures of one or more additives.

A wide variety of pigments may be used in the liquid intermediates of the present invention. Suitable pigments include organic, inorganic pigments, and mixtures thereof. Examples of suitable organic pigments include phthalocyanine blue, phthalocyanine green, scarlet red, ultramarine blue, quinacridone violet, and napthol red. Examples of suitable inorganic pigments are titanium dioxide, iron oxide, chromium oxide, and mixtures thereof. A single pigment may be used in a liquid intermediate. Alternatively, a liquid intermediate may contain a mixture of two or more different pigments. If incorporated in a liquid intermediate, pigment is generally present in the liquid intermediate in an amount of about 1 wt. % to about 80 wt. %. When used, pigment is preferably incorporated in a liquid intermediate in an amount of about 1 wt. % to about 40% wt. % and, most preferably, in an amount of about 5 wt. % to about 25 wt. %.

Alternatively, suitable colorants include dyes such as, for example, acid dyes. By way of illustration, dyes that are suitable for use in the liquid intermediates of the present invention include C.I. Solvent Green 28, Solvent Red 135, Vat Red 41, Solvent Blue 59

Suitable blowing agents include azocarbamide blowing agents such as, for example, Celogen AZ 130 manufactured by Uniroyal Chemical Company, Inc. (Middlebury, Conn.). Suitable release agents permit manufactured plastic parts to be removed from a mold easily and include waxes such as, for example, Acrawax C manufactured by Lonza. Suitable light stabilizers include Tinuvin 292 manufactured by Ciba Specialty Chemicals (Newport, Del.). Suitable laser-marking additives include various forms of mica. Suitable anti-settling agents include untreated silicas, treated silicas, clays, bentonties, and waxes.

The liquid intermediates used in the present invention may be prepared in any suitable manner. For example, the liquid intermediates may be either milled or unmilled. Under either technique for preparing liquid intermediates, the resulting intermediate should be a uniform dispersion in which the solid components (e.g., pigments, additives, etc.) and liquid components of the intermediate are fully dispersed and evenly distributed throughout the liquid vehicle. When milling is employed, one or more solid components of the liquid intermediate are added to one or more liquid components of the liquid intermediate and the resulting composition is then milled using any suitable milling device. Preferably, a media mill is utilized for such milling. The media mill may contain any suitable milling media such as sand, zirconia beads, glass or steel. Additional components of the liquid intermediate may be added after milling and mixed with the milled composition using traditional mixing techniques (e.g., agitators, blades, etc.) to ensure uniform mixing.

Alternatively, liquid intermediates and liquid concentrates may be prepared without milling. That is, the liquid vehicle and pigment as well as any other additives are placed in a suitable vessel, as is known, and mixed to produce uniform dispersion of a liquid intermediate or a liquid concentrate.

Liquid intermediates may be produced in any desired quantity. For example, a single batch of a particular liquid intermediate may contain one gallon, five gallons, 55 gallons, or other suitable amount.

Liquid intermediates may be commercially prepared by a manufacturer who provides the desired additive in a suitable liquid vehicle. Alternatively, the desired liquid intermediate may be prepared by combining one or more desired additives in a suitable liquid vehicle.

Following preparation of one or more liquid intermediates, the next step of the method of the present invention comprises standardizing the properties of each liquid intermediate. In this step, various properties of the liquid intermediates are standardized to reduce or eliminate any batch to batch variation of those characteristics that exist due to variations, either by batch or otherwise, in the properties of the liquid vehicle, colorant or other additive present in the liquid intermediate. By way of standardization, the user of the liquid intermediates has improved control over the effect of the liquid concentrate, and each batch of liquid concentrate, on the final manufactured plastic part.

With respect to liquid intermediates containing a non-colorant additive, the additive amount and viscosity of each liquid intermediate are standardized. Preferably, the liquid intermediate is standardized on the basis of weight In particular, with respect to liquid color intermediates, at least one, and most preferably, all of the tint strength, hue and viscosity of each liquid color intermediate are standardized. Preferably, the liquid color intermediate is standardized on the basis of weight (i.e., by gravimetric means). This means that a pound of a given liquid color intermediate produced today will exhibit at least similar, and, more preferably, identical tint strength, hue and viscosity characteristics to a pound of the same liquid color intermediate (i.e., same liquid vehicle, pigment and other additives) manufactured at some point in the future using different lots of the raw materials. Standardization of the liquid intermediates permits a plastic part manufacturer to produce plastic parts that satisfy the required product specifications on a consistent basis. For example, through a standardization procedure, different batches of the same titanium dioxide mono-dispersion produced at different times may be used in the manufacture of colored molded plastic parts that exhibit substantially identical color characteristics.

The standardization step advantageously permits the subsequent dispensing of the liquid intermediates to produce a liquid concentrate without the user of the liquid intermediates having to know various characteristics (e.g., tint strength, color hue, viscosity, etc.) of the liquid intermediates. Accordingly, the user of the liquid intermediates can continuously produce an accurate, consistent liquid concentrate from batch to batch without the need to determine whether there is any variation in the starting liquid intermediates. By using liquid concentrates prepared using standardized liquid intermediates, plastic part manufacturers can produce parts having the desired characteristics that meet the necessary specifications with respect to color or other physical property.

A liquid concentrate made according to a given gravimetric formula establishing the unit quantity (i.e., weight, volume, etc.) of the liquid intermediates used to make that liquid concentrate will exhibit nearly identical tint strength, color hue and viscosity characteristics from batch to batch as compared to a standard. Preferably, the liquid intermediates are standardized on a gravimetric (i.e., weight) basis. This permits the use of a weight-based formula for a particular liquid concentrate such that the required weights of the liquid intermediates that make up the liquid concentrate can be accurately measured and added.

The standardization step may be carried out in any suitable manner. Generally, standardizing involves the sampling of a previously prepared liquid intermediate, analyzing the liquid intermediate sample and comparing the results of the analysis to a reference standard for the particular liquid intermediate that is being produced. Finally, if necessary, the liquid intermediate is adjusted so that the characteristics of the intermediate match the standard.

If necessary, an adjustment to standardize a liquid intermediate may be performed in any suitable manner. For example, the tint strength and color hue of a liquid color intermediate may be increased by adding more pigment or dye to the liquid color intermediate. Alternatively, the tint strength and color hue of a liquid color intermediate may be reduced by adding more of the liquid vehicle to the liquid color intermediate. In general, it is easier, more predictable and controllable to adjust color characteristics by adding more of a liquid component (e.g., liquid carrier or other liquid additive) than adding more of a solid component (e.g., pigment or other solid additive). Preferably, the standard for a liquid color intermediate should be established on the weak side (i.e., less colorant) rather than on the strong side (i.e., more colorant). In this way, adjustments may be made, if needed, to produce a liquid intermediate with batch-to-batch consistency which matches the standard within acceptable tolerances.

Several adjustments of the liquid intermediate may be necessary to yield a liquid intermediate that matches the reference standard within acceptable tolerances. Viscosity may similarly be altered to an appropriate level by adjusting the liquid vehicle. In general, viscosities in the range of about 100 centipoise to about 35,000 centipoise are desirable for the liquid intermediates so that the liquid intermediates can be easily pumped from one location to another. Preferably, the liquid intermediates have a viscosity of about 10,000 centipoise to about 17,000 centipoise when measured at room temperature.

The analysis of the liquid intermediate and comparison to a reference standard may be carried out on the liquid intermediate itself. Alternatively, a molded plastic part containing a liquid intermediate may be manufactured (known as a color chip), and analyzed. The analysis of the color-related characteristics of the liquid intermediate may be carried out in any suitable manner and generally involves the use of a spectrophotometer.

The preparation of standardized liquid intermediates according to the present invention may be carried out by other suitable means. For example, the components of a liquid intermediate (i.e., liquid vehicle, pigment, other additives, etc.) may be adjusted in a suitable manner prior to the preparation of the intermediate to yield a standardized liquid intermediate. In this manner, the characteristics of the liquid intermediate may not need to be adjusted by the addition of additives or otherwise after the liquid intermediate is prepared. Instead, the standardization of such liquid intermediate is achieved by standardization of the various components of that liquid intermediate.

After each liquid intermediate for a particular application is prepared and standardized, it is transferred to a remote location in accordance with the present invention. Through this transfer step, liquid intermediates are preferably produced in one location and then moved to another location where a liquid concentrate containing one or more liquid intermediates is manufactured. A remote location includes a location different than the location where the liquid intermediates are prepared. For example, the remote location may include another facility, at the same or different manufacturing site, of the manufacturer of the liquid intermediates as well as a facility of another company that uses liquid concentrates in the manufacture of plastic parts. A remote location also includes a regional facility operated by the manufacturer either the liquid intermediates or the manufacturer of the plastic parts or by an independent or affiliated third party.

Preferably, the liquid intermediates are prepared and then transferred to the location where a liquid concentrate is to be manufactured and incorporated into plastic parts. Advantageously, the method of the present invention allows the decentralized production of liquid concentrates, both for sampling and the manufacture of plastic parts. Accordingly, users of liquid concentrates can produce concentrates immediately at or near their plastic part manufacturing facility in response to customer demand by using liquid intermediates that have been previously prepared elsewhere, for example, by the manufacturer of the liquid intermediates, and provided to such user and kept in stock on the user's premises. From the perspective of the user of the liquid intermediates, therefore, the standardized liquid intermediates that have been prepared remotely are provided to use in producing a liquid concentrate according to a process of the present invention.

Transferring of the liquid intermediates to a remote location may be accomplished by any suitable method. Liquid intermediates may be placed in a container such as, for example, a 1-gallon pail, 1-gallon bladder in a box, 5-gallon pail, 30-gallon drum, 55-gallon drum, 250-gallon tank, 500-gallon tank, totes or tanker truck, depending upon the quantity of liquid intermediate needed. The container may then be transported to the desired remote location. Shipments of liquid intermediates may be made both nationally and internationally. Preferably, the remote location is where the liquid concentrate will be manufactured and, most preferably, where the liquid concentrate will be prepared and incorporated into manufactured plastic parts, including as part of the sampling, evaluation and approval process where applicable. Alternatively, if suitable, liquid intermediates may be pumped to another location, either at the same facility or outside the facility, where the liquid concentrate is prepared.

After the liquid intermediates are transferred to a remote location, one or more of the liquid intermediates are dispensed to produce a liquid concentrate. A dispensing machine may be used to dispense liquid intermediates. The quantity of each liquid intermediate dispensed is controlled according to a predetermined formula for the desired liquid concentrate. Preferably, the formula is a gravimetric formula. Alternatively, the predetermined formula for the liquid concentrate in accordance with the present invention may be volumetric. The predetermined formula determines which color intermediates are to be dispensed and the quantity by weight, volume or some other measurement, of each liquid intermediate to be dispensed that will result in a liquid concentrate having the desired color or other performance characteristics.

When a predetermined gravimetric or weight-based formula is employed, the liquid intermediates may be dispensed accurately using a scale. No calculations or other conversion factors are needed to dispense the proper amounts of each liquid intermediate. Accordingly, the use of a gravimetric formula provides a simple, accurate method for adding liquid intermediates together in the necessary quantity to produce the desired liquid concentrate.

An example of a gravimetric formula for a liquid concentrate of the present invention includes a concentrate containing the following liquid intermediates:

| | weight % |
|---|---|
| Titanium dioxide dispersion liquid color intermediate | 85.00 |
| Ultramarine blue dispersion liquid color intermediate | 5.00 |
| Tinuvin ® 292 (UV stabilizer) liquid intermediate | 10.00 |

The titanium dioxide dispersion liquid intermediate used in this liquid concentrate contains the following components:

| | weight % |
|---|---|
| Tween ® 85 | 16.52 |
| Avatech ® 80N | 9.50 |
| Doverphos ® 4 | 1.98 |
| Titanium dioxide | 72.00 |

The ultramarine blue dispersion liquid intermediate used in this liquid concentrate contains the following components:

| | weight % |
|---|---|
| Tween ® 85 | 25.14 |
| Avatech ® 80N | 14.47 |
| Doverphos ® 4 | 3.01 |
| Ultramarine blue | 57.38 |

The predetermined formula for the liquid concentrate produced according to the present invention may be provided by the manufacturer of the liquid intermediates. Alternatively, the user of the liquid intermediates may provide the predetermined formula for the desired liquid concentrate. In either scenario, the formula is prepared prior to dispensing the liquid intermediates. This permits the quantity of each liquid intermediate that is dispensed to be controlled according to a given quantity (e.g., weight, volume, etc.) which results in the production of the desired liquid concentrate. By using a predetermined formula in connection with standardized liquid intermediates, highly consistent liquid concentrates can be reproduced, from batch to batch, as needed on a timely basis in response to customer demands and efficient and cost effective scheduling of the manufacture of the plastic parts for which the liquid concentrate is used.

Preferably, the liquid concentrate user (i.e., plastic part manufacturer) submits specifications for the desired liquid concentrate to another entity such as, for example, a liquid intermediate and/or liquid concentrate manufacturer. In most cases, the liquid concentrate user (i.e., the manufacturer of a given plastic part or an end-user designer of such plastic parts) will submit specifications as to color and other attributes desired for the final plastic part. The intermediate and/or liquid concentrate manufacturer then prepares a liquid concentrate to meet the user's requirements. This may include developing the formula to make a liquid concentrate which will achieve the desired results in the final plastic part. The user may submit color and performance characteristics of the desired liquid concentrate and/or final plastic part, with or without submission of a physical standard. For example, when a liquid color concentrate is desired, color spectral data (e.g., generated using a spectrophotometer) may be provided to the liquid intermediate and/or liquid concentrate manufacturer. Such spectral data may be sent by electronic means. A formula is then developed to provide a liquid concentrate using one or more liquid intermediates that satisfies the color and/or additive requirements of the user of the liquid concentrate.

The predetermined formula for the liquid concentrate is then transmitted (electronically or otherwise) to the end-user and, in particular, to the dispensing machine to produce the desired liquid concentrate for use in the manufacture of plastic parts. According to process of the present invention, liquid concentrates exhibiting the desired color and performance characteristics may be produced and ready to incorporate into manufactured plastic parts in a few minutes, as opposed to a traditional multiple-week liquid concentrate production schedule. This scenario applies to the preparation of samples of liquid concentrates used for evaluation and approval purposes as well as final liquid concentrates used in the manufacture of plastic parts in production. A database of formulas (referred to below as the formula library) may also be made available to the user at the dispensing machine, which will permit the user to select from multiple predetermined liquid concentrate formulations to immediately match color and performance requirements.

The quantity of liquid intermediate dispensed is controlled either manually or automatically, for example, by a computer. The predetermined formula for a liquid concentrate to be produced may be written down on paper. An operator can review the formula and then dispense the necessary quantity (e.g., weight, volume, etc.) of liquid intermediates. Alternatively, the predetermined formula may be stored in a computer. In this way, an operator can access the predetermined formula for a desired liquid concentrate from the computer and determine the precise amount of each liquid intermediate necessary to produce the liquid concentrate end-product. Multiple formulas for a wide variety of liquid concentrates (both colored and not colored) may be stored in the computer so that a user can choose a liquid concentrate possessing the desired color or performance characteristics.

The predetermined formula may be inputted into the computer in any suitable manner. For example, the formula may be inputted locally at the location where the computer physically resides. An operator will enter the formula directly into the computer while standing at the dispensing machine that houses the computer. This input of the predetermined formula into a computer may optionally be done by the manufacturer of the liquid intermediates and/or liquid concentrates or by the user of the liquid concentrates. The predetermined formula may alternatively be inputted into the computer remotely. That is, the formula may be prepared remotely such as, for example, by the manufacturer of the liquid intermediates and/or liquid concentrates in its laboratory, and inputted by electronic means (e.g., modem, internet, etc.) to a computer at the location where a liquid concentrate will be dispensed. The input of a predetermined formula for a liquid concentrate at a remote location advantageously permits formulas for existing liquid concentrates, as well as new liquid concentrates and modified formulas for existing liquid concentrates to be quickly implemented by the user (e.g., plastic part manufacturer) while minimizing potential errors that may occur in the transfer of the formula from one person to another person.

The dispensing of liquid intermediates may be performed in any suitable manner. The dispensing step may be accomplished by hand with or without the use of mechanical (e.g., pumping) equipment or by suitable automated (either semi-automated or fully automated) dispensing equipment involving the use of computerized process controls. Preferably, a computer is utilized to control the dispensing of the liquid intermediates. When a computer containing the desired predetermined formula is used to control the quantity of liquid intermediates dispensed, the dispensing of each liquid intermediate necessary to produce a liquid concentrate may be controlled by the same computer.

Figure 1:
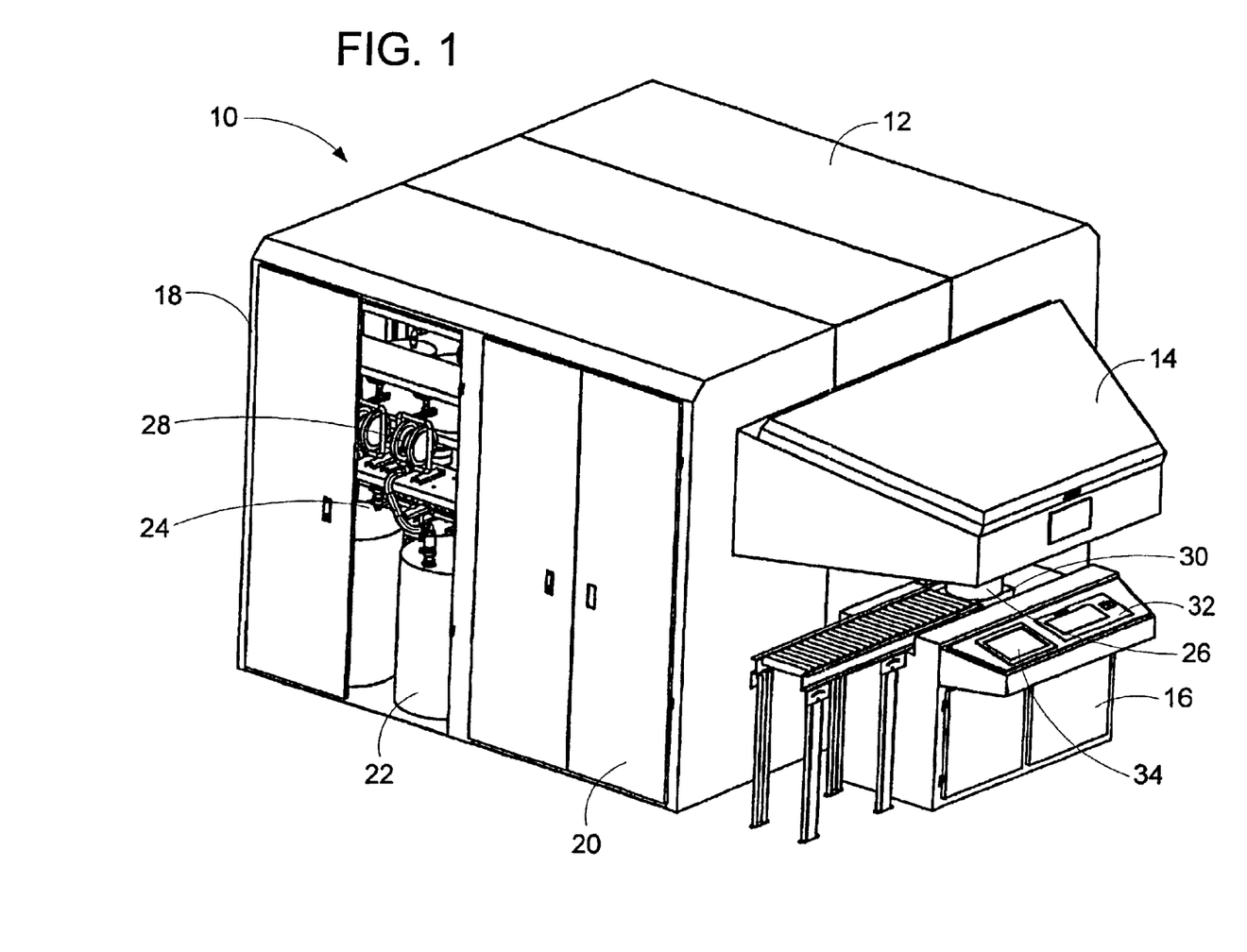
FIG. 1 is a perspective view of a dispensing machine for dispensing liquid intermediates to produce a liquid concentrate, in accordance with the present invention.

A dispensing machine as generally shown in FIG. 1, for example, may be used to dispense liquid intermediates to produce a liquid concentrate. In this representative dispensing machine useful in the present invention, the dispensing machine 10 includes a stock area 12, a dispensing section 14 and a process control cabinet 16. The dispensing machine preferably has the ability to hold and dispense several different liquid intermediates, such as 36, 48 or more distinct liquid intermediates, to permit the production of a wide variety of liquid concentrates including both liquid color concentrates and liquid additive concentrates. The various liquid intermediates may be provided in various container sizes. The amount of each liquid intermediate supplied to the dispensing machine will depend on the specific needs of the user that will operate the dispensing machine to prepare liquid concentrates.

The stock area 12 has a housing 18 with access doors 20 that contains the liquid intermediates as well as portions of the mechanical, electrical and process control systems of the dispensing machine 10. The stock area may be enclosed as shown in FIG. 1. Alternatively, the stock area may be part of a warehouse area with containers of liquid intermediates appropriately arranged on the floor or on shelves to be hooked-up to the lines and pumps feeding the dispensing valves of the dispensing machine. Liquid intermediates are stored in one or more containers 22. These containers 22 may be drums, buckets, cans or another other suitable container for holding the liquid intermediates. Various size containers may be used in the dispensing machine 10. Preferably, the liquid intermediates are supplied and transported in containers 22 which may then be easily connected to a line 24 for further processing without having to transfer the liquid intermediates from the container used for shipping purposes to another container from which the liquid intermediates are dispensed. Alternatively, the liquid intermediates may be transferred from shipping containers to other appropriate containers for dispensing utilizing the dispensing machine.

The liquid intermediate is pumped to a container 26 by a pump 28. Specifically, the container 22 is connected via a line 24 to a pump 28. From the pump 28, the individual liquid intermediate flows through a feed pipe and dispensing valve contained in the dispensing section 14 of the dispensing machine 10 into a container 26. One or more liquid intermediates are pumped from various containers 22 to a container 26 to produce the desired liquid concentrate. Each liquid intermediate has a line 24, pump 28, feed pipe and dispensing valve connected to it. In this way, the preparation of the liquid concentrates can be accurately controlled by avoiding any contamination in the various feed pipes during the dispensing operation. When the dispensing machine is configured to hold multiple liquid intermediates (e.g., 36 or 48 liquid intermediates), the dispensing valves may be configured into various dispensing heads that can move in a biaxial direction. The use of moveable dispensing heads permits the dispensing of multiple liquid intermediates into a container 26 that remains stationary during the dispensing step.

Any suitable pump may be used to dispense the liquid intermediates from containers 22 through a dispensing valve and into container 26. A preferred pump when a predetermined gravimetric formula is utilized is a double diaphragm pump. Such pumps are preferably controlled pneumatically. The pumps employed should permit the accurate dispensing (i.e., within 0.1 gram or accuracy) of liquid intermediates. Alternatively, volumetric-type pumps may be used where the quantity of liquid intermediate dispensed is controlled by a predetermined volumetric formula. Suitable volumetric pumps for dispensing liquid intermediates include peristaltic-type pumps. Suitable pumps used in the present invention optionally include anti-pulsation dampners to prevent damage to other components of the dispensing equipment due to vibration of the pumps.

In a preferred embodiment of the invention, the a positive pressure is maintained throughout the dispensing system at all times in the lines and feed pipes connecting the container in the stock area to the dispensing valves. To assure such positive pressure this invention includes (i) the insertion of a "check-valve" at the junction of the feed lines to each container in the stock area hooked up to the system; and (ii) a feed pipe from that junction down into each container so that the feed pipe will at all times be completely immersed in the liquid intermediate.

The present invention also includes the design of the liquid intermediate container which will be used in the stock area of the dispensing machine to reduce the amount of residual liquid intermediate required to be in the container necessary to assure complete immersion of the feed pipe and, thus, maintain positive pressure throughout the dispensing system at all times. Appropriate stop levels should also be programmed into the computer to prevent a draw down of the residual which would permit air to enter the system and break the positive pressure.

The process control cabinet 16 holds the process controls for the dispensing machine 10. A scale 30 sits on top of the process control cabinet 16. The process control cabinet 16 houses a computer 32 that is connected to a display monitor 34. The scale 30 may be of any suitable type to accurately weigh varying amounts of liquid intermediates. The size of the scale 30 should also permit the preparation of both small and large batches of liquid concentrates such as 1 gallon, 5 gallon, and 55 gallon quantities that are dispensed into 1 gallon, 5 gallon and 55 gallon containers, respectively.

The dispensing machine 10 of FIG. 1 useful in the present invention may be automated with an electropneumatic process control system. The control system may operate the pneumatic pumps 28 and dispensing valves. The computer 32 may include a programmable logic controller (PLC) that communicates between the computer 32 and the components of the dispensing machine 10, such as the pneumatic pumps 28, dispensing valves and scale 30. Alternatively, another type of control system suitable for the accurate dispensing of liquid concentrates may be utilized. The computer 32 can include a microprocessor which contains the various programs necessary to achieve the desired functions described herein. The microprocessor can include a keyboard and a display monitor 34 such as a CRT display. Those skilled in the art will readily appreciate the many alternative arrangements for controlling the dispensing machine of the present invention.

Information and other data about individual liquid intermediates, including code numbers, location and amount available for use, are preferably inputted into the computer from which specific predetermined formulas for liquid concentrates may be produced. The collection of liquid intermediates available for use and stored in the computer 32 is referred as the intermediate library. The addition of intermediates into the intermediate library in the computer 32 is accomplished using an "intermediate building" sequence. In this sequence, the operator is prompted to enter a code number and description for a particular liquid intermediate that is entered into the intermediate library. For intermediates to be included in the stock area of the dispensing machine, these will be added to the intermediate library and the dispensing valve and/or pump through which the liquid intermediate will be dispensed will be identified.

Alternatively, a liquid intermediate or other component of the liquid concentrate (e.g., a dry additive such as a metallic flake) may be designated for manual addition, also referred to as "hand add," which means that such liquid intermediate or other component is to be added to the liquid concentrate manually by the operator. Such liquid intermediates and/or other components may be weighed out by using the scale 30 to directly add the required amount of the component to the container 26. Optionally, the component may be pre-weighed using another weighing device that is separate from the dispensing machine and then added to the container 26.

Using the liquid intermediates stored in the intermediate library, formulas for liquid concentrates may be prepared using a "formula building" sequence and stored in a formula library in the computer 32. The operator is initially prompted by the computer to enter a code number and description for the desired formula. The liquid intermediates that make up the formula for the desired liquid concentrate are then selected along with the weight percent of each intermediate in the liquid concentrate. The total weight percent for all components of the desired formula should be 100%. If not, the operator is prompted to adjust the amount of any of the liquid intermediates such that the total is 100%. The collection of liquid concentrates available for use and stored in the computer 32 is referred as the formula library or, alternatively, as the concentrate library.

Preferably, the order in which the intermediates are entered into a given formula is the particular order in which such intermediates are dispensed into the container 26. In this embodiment, intermediates or other components that are designated as "hand add" are entered into the formula after other intermediates that are included in the stock area of the dispensing machine have been added to the formula. In such a formula containing "hand add" intermediates or other components, liquid intermediates are first dispensed through the dispensing valves followed by the manual addition of the remaining "hand add" intermediates or other components to produce the desired liquid concentrate.

The formula building sequence may also permit the modification of an existing formula for a liquid concentrate. For example, an operator may either add or remove one or more liquid intermediates from a desired concentrate formula. Alternatively, the weight percent of the various intermediates may be adjusted such that the components will be added in different amounts. Following adjustment of a liquid concentrate formula, the total weight percent for all components of the desired formula should remain at 100%. If not, the operator is prompted to adjust the amount of any of the liquid intermediates such that the total is 100%. The formula in the computer will be adjusted to conform to such physical adjustments. This function may be performed by the operator at the dispensing machine. Alternatively, concentrate formulas may be adjusted remotely, for example by the manufacturer of the liquid intermediates or liquid concentrates and communicated to the dispensing machine or computer 32. The ability to adjust existing formulas stored in the formula library will be particularly useful in the sampling evaluation and approval process, as it will permit revised formulas to be developed at the dispensing machine or remotely in the laboratory of the liquid intermediate or concentrate manufacturer and then dispensed by the dispensing machine for prompt, even immediate, re-sampling and evaluation. This will significantly reduce the time and cost of this part in the process of producing satisfactory plastic parts.

The dispensing of liquid intermediates may be fully automated, semi-automated or manual. In an exemplary fully automated system, an operator accesses a predetermined gravimetric formula for the desired liquid concentrate from the computer 32 and initiates the liquid concentrate preparation process. The operator may select the desired liquid concentrate according to a code (e.g., Blue 123) for that particular liquid concentrate. The desired liquid concentrate may be selected from the formula library. Alternatively, one or more individual liquid intermediates may be selected from the intermediate library for dispensing.

The dispensing begins with the computer 32 starting the appropriate pump 28 associated with the necessary liquid intermediate. The dispensing valve is also opened to permit the liquid intermediate to be dispensed. The computer 32 in such a fully automated system will be programmed with the location of the liquid intermediates in containers 22 such that the pump 28 and dispensing valve for a particular liquid intermediate will automatically start and open, respectively, without the need for operator input to manually select the particular pump to start and dispensing valve to open.

Each of the various liquid intermediates that comprise the desired liquid concentrate is automatically pumped from the tank 22 to the container 26 through the line 24, feed pipe and dispensing valve by pump 28. The quantity of liquid intermediate dispensed is monitored by the scale 30. When the appropriate quantity of each liquid intermediate being dispensed is present in container 26 on the scale 30 as detected by the computer 32, the computer shuts off pump 28 and the related dispensing valve to terminate dispensing of that particular liquid intermediate. The computer 32 then repeats the dispensing procedure for each of the liquid intermediates needed to produce the desired concentrate in accordance with the predetermined formula for that liquid concentrate.

The computer 32 that controls the dispensing of liquid intermediates may optionally be used for inventory control. When a container 22 of a new liquid intermediate is added to the dispensing machine 10, an operator may be prompted to enter the quantity (e.g., weight, volume, etc.) of the liquid intermediate initially present in the container 22. The computer stores the quantity of liquid intermediate initially present and updates this quantity as the liquid intermediate is dispensed into liquid concentrates. When the quantity of the liquid intermediate remaining in container 22 reaches a given level, preferably set by the operator and/or in response to the liquid concentrate user's forecasted requirements, a warning or other alarm may be given by the computer 32 to indicate that more liquid intermediate is needed. Alternatively, the computer may send an electronic order request to the liquid intermediate manufacturer or plastic part producer which states the need to ship additional intermediate for use in the dispensing machine.

When new liquid intermediates are entered into the computer using the intermediate building sequence, the operator is prompted to provide the amount of the particular intermediate added to the stock area. As part of the intermediate building sequence, a warning level is set. When a specified amount of liquid intermediate has been dispensed from its container such that the warning level is reached, the computer notifies the operator of the low level for this liquid intermediate. When the warning level is reached, the operator should take appropriate actions to use the balance of the liquid intermediate in the container then in the stock area (i.e., the residual liquid intermediate) and then replace or refill that container with an additional quantity of the same liquid intermediate. The amount of liquid intermediate added to the system is inputted into the computer to allow the accurate tracking of the inventory for the particular liquid intermediate. In addition to a warning level, a stop level for each liquid intermediate may be entered into the computer using the intermediate building sequence.

Before each intermediate is dispensed, the computer checks the current amount of the desired intermediate present in the container. If the required amount of liquid intermediate would result in the amount of intermediate falling below the stop level, the computer will not permit this intermediate to be dispensed. In this situation, the operator must refill such intermediates for dispensing to proceed. Alternatively, the operator may manually adjust the dispensing machine to use the residual liquid intermediate to partially fulfill the formula requirements for that particular liquid intermediate and then complete the formula from the newly added liquid intermediate. Preferably, when an operator chooses a formula for the desired liquid concentrate to be produced, he will confirm that there is a sufficient amount for each intermediate to be dispensed to produce the desired concentrate. If there is a shortage, the operator will schedule appropriate actions to use the residual liquid intermediate and refill the container or attach a new container to the dispensing machine in the stock area, so as to facilitate the timely production of the required liquid concentrate.

An "inventory adjustment" sequence can by employed by the computer to permit the tracking of intermediate inventories. When an amount of a liquid intermediate is added to the dispensing system, the inventory adjustment sequence prompts the operator to enter the new amount of the liquid intermediate present in the container.

The computer permits the preparation of reports detailing current inventory levels of liquid intermediates contained in the stock area of the dispensing machine. Liquid intermediate usage reports may also be generated by the computer to permit an operator to track the amount of liquid intermediates used and the quantity of liquid concentrates produced. Such inventory and usage reports may be outputted locally at the dispensing machine or may be sent by electronic means to a remote location. For example, the inventory and usage reports may be sent by electronic mail to a different location including the location where the liquid intermediates are standardized prior to their inclusion in the dispensing machine. Such reports may be viewed visually on a computer screen or printed out.

Inventory and usage reports may be generated upon request of the operator or other individual, including the manufacturer of the liquid intermediates. Alternatively, these reports may be automatically generated at specified intervals of time, for example once every 8-hour shift, daily, weekly, bi-weekly, monthly, etc. It is anticipated that the manufacturer of the liquid intermediates will use this inventory data to assure the availability of all necessary liquid intermediates at the site of the machine when required to produce related liquid concentrates.

The dispensing machine may also have a billing feature. The computer may generate a bill to the appropriate entity by multiplying the intermediates used (or concentrates produced) times the applicable cost. Bills may be generated upon request at specified time periods (i.e., weekly, monthly, etc.). The bill may be transmitted by electronic means from the computer to the person or entity responsible for payment. In an alternative embodiment, the responsible entity may set up a debit account containing a specified sum of money. At intervals agreed upon by the parties, the computer would automatically deduct the cost for the amounts of liquid intermediates dispensed or liquid concentrates produced from this debit account.

The computer used in the dispensing machine preferably has one or more security features to ensure that only authorized operators can use the dispensing system of the present invention. For example, when the computer dispensing program is started, the operator is prompted to enter a password or passcode to permit access to the dispensing machine. If the proper password is not entered, the operator is prohibited from accessing the various sequences stored in the computer (e.g., the intermediate building sequence or formula building sequence) or using the dispensing machine to prepare liquid concentrates. Different levels of security may be employed that permit different operators to carry out permitted tasks using the dispensing machine. For example, one code may be required for use of the dispensing machine to dispense a desired liquid concentrate. A different code may be necessary for use of inventory building and formula building sequences.

In a typical semi-automatic dispensing process of the present invention, the predetermined gravimetric formula for the desired liquid concentrate is accessed by an operator from the computer 32. The operator then initiates the dispensing of each individual liquid intermediate component of the formula separately. For example, an operator will select a necessary liquid intermediate and initiate a dispensing sequence for this particular liquid intermediate. The dispensing of subsequent liquid intermediates requires operator instructions to initiate the dispense in such a semi-automatic process. The use of less automation in the dispensing process of the present invention is also permitted. For example, an operator may need to select the precise liquid intermediate and its location in the stock area 12 for the dispensing of that liquid intermediate to be accomplished. Alternatively, an operator may have to manually enter the desired quantity of a given liquid intermediate into the computer 32.

A manual dispensing process may also be employed in the context of the present invention. In such a manual system, an operator manually activates the pump 28 and dispensing value using a switch or other suitable means for a desired liquid intermediate. The operator monitors the weight of that liquid intermediate that has been dispensed into container 26 as indicated by scale 30. When the required amount of a liquid intermediate has been added to container 26 in accordance with the predetermined formula (e.g., gravimetric, volumetric or otherwise) for the desired liquid concentrate end-product, the pump 28 and dispensing valve are shut off and closed to terminate the dispensing step.

In an alternative embodiment, a combination of two or more dispensing valves may be connected to a single feed pipe. For example, a feed pipe may be split into two separate lines with a large dispensing valve connected to the one line and a small dispensing valve connected to the other line. In general, large dispensing valves permit the flow of larger amounts of a liquid intermediate in the range of about 1 pound per 15 seconds. Small dispensing valves generally permit liquid intermediate flow in the range of about 1 pound per 60 seconds. Preferably, a large and small dispensing valve are used in this configuration of the invention to permit the accurate dispensing of liquid intermediates in a minimum amount of time. By using both small and large dispensing valves for the dispensing of desired liquid intermediates, the dispensing machine of the present invention can dispense about 100 pounds of liquid concentrates per hour. The dispensing capacity of the dispensing machine is determined by the configuration of large and small valves, and whether the liquid intermediates are dispensed consecutively or concurrently.

For example, a liquid intermediate may be initially dispensed through a large dispensing valve. After a predetermined portion of the required amount of liquid intermediate is dispensed, the small dispensing valve is opened and the large dispensing valve is closed. The remainder of the required amount of liquid intermediate is dispensed through the small dispensing valve which results in the accurate addition of the desired liquid intermediate to the liquid concentrate. The switch between large and small dispensing valves may be completed at any point during the dispensing of a liquid intermediate. For example, after 50% of the desired liquid intermediate has been dispensed the small dispensing value is used for the remainder, preferably the switch-over will occur after 90% of the desired liquid intermediate has been dispensed and, most preferably, after 95% of the desired liquid intermediate has been dispensed.

In a preferred embodiment, the dispensing valve configuration is automated. When an operator initiates the dispensing of an individual liquid intermediate, the control system opens the large dispensing valve. After a predetermined amount of liquid intermediate has been dispensed, as determined by the scale and communicated back to the computer via a PLC or other means, the small dispensing valve is opened and the large dispensing valve is closed. During this switch from the large to small dispensing valve, the pump may optionally be shut off. The dispensing of the liquid intermediate continues through the small dispensing valve until the required amount has been dispensed and then the valve is closed.

The liquid intermediates may be dispensed in any order according to the present invention to produce the desired liquid concentrate. The liquid intermediates may be dispensed consecutively (i.e., one after another). Desirably, the liquid intermediates are dispensed consecutively in order of the heaviest intermediate on a weight basis to the smallest intermediate on a weight basis. Alternatively, the liquid intermediates may be dispensed in order of the largest intermediate on a volumetric basis to the smallest intermediate on a volumetric basis. The various liquid intermediates may also be dispensed concurrently to shorten the time necessary to produce the desired liquid concentrate.

As dispersions, the liquid intermediates of the present invention may have a tendency to settle over time. Accordingly, after liquid intermediates are transferred to a remote location and allowed to sit for a significant period of time prior to being dispensed as part of a liquid concentrate, solid components (e.g., pigments) present in the liquid intermediates may settle in the container. Advantageously, therefore, the liquid intermediates may optionally be agitated prior to dispensing into a liquid concentrate to ensure the use of a uniformly dispersed liquid intermediate starting material which, in turn, yields more desirable liquid concentrate end-products.

The agitation of the liquid intermediates according to the present invention may be carried out by any suitable method. For example, a liquid intermediate may be agitated by recirculating, mixing, shaking, stirring or any other suitable mechanism. When recirculation is utilized to agitate the liquid intermediates, a pump may be used to cause recirculation. As illustrated by the dispensing machine 10 in FIG. 1, for example, a liquid intermediate in container 22 may be recirculated using pump 28 by configuring the dispensing machine 10 to allow for recirculation. In such a recirculation configuration, instead of pumping the liquid intermediate through the dispensing valve in the dispensing section 14, a line is provided in the dispensing machine 10 to allow the liquid intermediate to be recirculated by pump 28 back to the container 22 that holds this liquid intermediate. This recirculation prevents the settling of one or more solid components of the liquid intermediate.

When utilized in the process of the present invention, the agitation step may be carried out manually or automatically. An operator may manually initiate agitation on a periodic basis. Alternatively, agitation may be controlled by a computer and, preferably, the same computer that controls the dispensing of the liquid intermediates. The computer may be programmed to agitate (i.e., recirculate) different liquid intermediates at different intervals depending upon the physical properties of the respective liquid intermediates. The use of a computer to control agitation by any suitable method, such as recirculation, permits the respective liquid intermediates to be kept uniformly dispersed without the need for any operator input. Automatic recirculation of the liquid intermediates may be take place on a periodic basis such as, for example, one or more times every 24 hours to prevent settling.

After a liquid concentrate is prepared according to the process of the present invention, the liquid concentrate may optionally be subjected to a mixing step. The mixing step advantageously provides consistent batches of liquid concentrate. The container in which the liquid concentrate is prepared may be conveyed to a separate mixing station where suitable mixing equipment is utilized. Liquid concentrates may be mixed by any suitable method such as, for example, by a single-axis or multi-axis shaker. Alternatively, a mixing blade may be used to mix the liquid concentrate. When mixing is used, the liquid concentrate is preferably mixed for a sufficient period of time to produce uniformly dispersed mixtures of the liquid intermediates which make up the liquid concentrate.

Mixing may be accomplished manually by an operator or automatically by a computer. When an automatic mixing procedure is employed, the control of the mixing may be incorporated into the same process control system used to control the quantity of liquid intermediates for dispensing as well as the dispensing of the liquid intermediates. The equipment used to carry out the mixing step may be included in the dispensing machine 10 as shown in FIG. 1. After the liquid intermediates are dispensed into the container to produce a liquid concentrate, the liquid concentrate may be conveyed manually or automatically to a mixing station where mixing is carried out. Additional additives and other components of the final liquid concentrate in solid form may optionally be incorporated by "hand add" into the liquid concentrate after it is prepared and before it is mixed.

Figure 2:
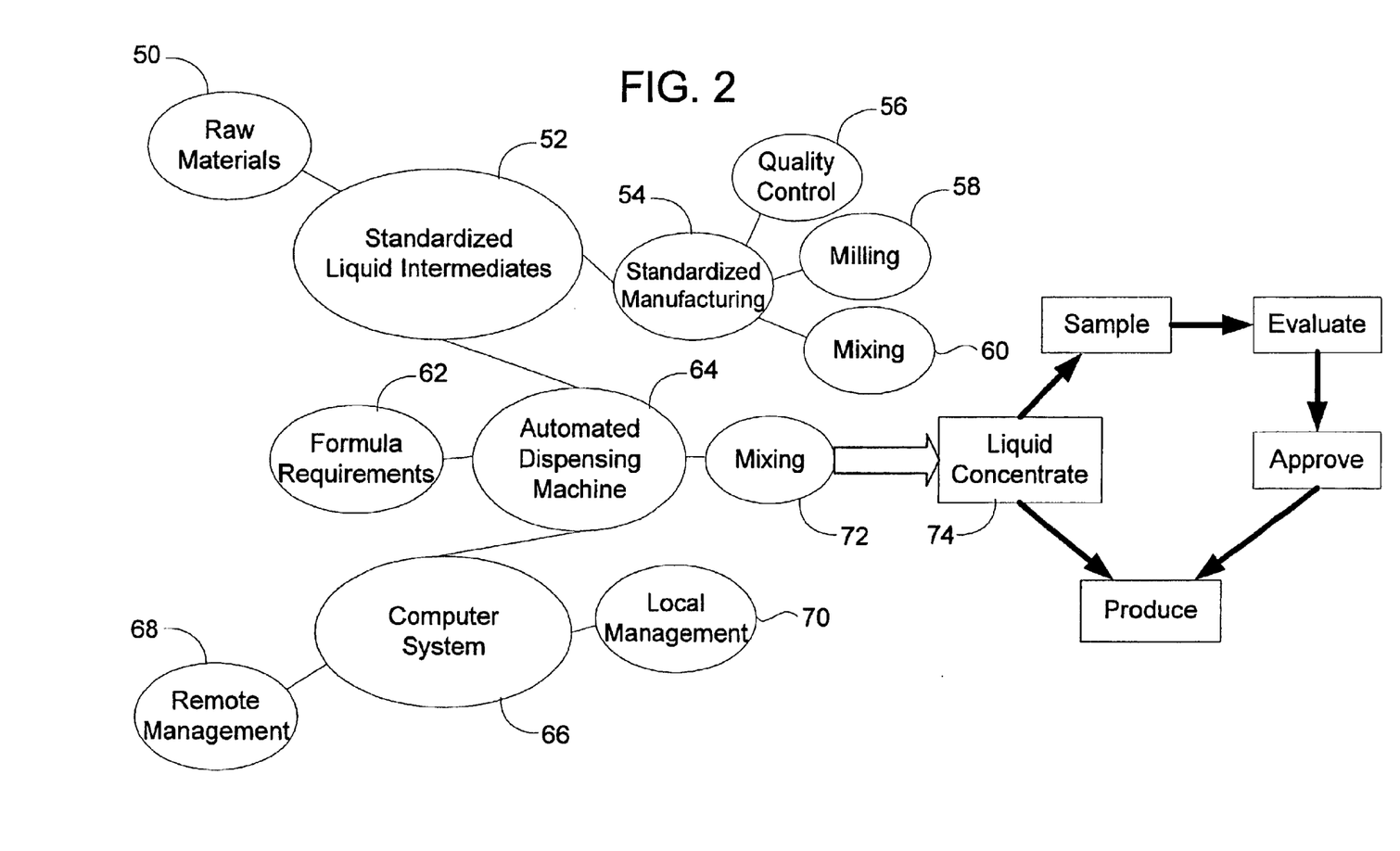
FIG. 2 is a flowchart of a process for preparing a liquid concentrate, in accordance with the present invention.

A process for preparing liquid concentrates in accordance with the present invention is shown in the flowchart in FIG. 2. Turning to FIG. 2, raw materials 50 are used to prepare standardized liquid intermediates 52 through the use of carefully controlled manufacturing procedures 54. Such procedures involve quality control 56 to produce liquid intermediates possessing physical characteristics within tight manufacturing tolerances. With respect to liquid color intermediates of the present invention, the tint strength, color hue and viscosity are standardized to achieve batch-to-batch consistency. For other liquid intermediates, the additive amount and viscosity are standardized to achieve batch-to-batch consistency. The standardized manufacturing procedures may include a milling step 58 and mixing step 60. One or more liquid intermediates 52 are then dispensed from a remote location to produce a desired liquid concentrate. The quantity of each liquid intermediate dispensed is controlled by the predetermined formula requirements 62 for the desired liquid concentrate.

The automated dispensing machine 64 includes a computer system 66 that is used to control the quantity of each liquid intermediate dispensed as well as the dispensing of one or more liquid intermediates to produce the desired liquid concentrate. The formula requirements 62 for the desired liquid concentrate may be inputted into the computer system 66 of the automated dispensing machine 64 remotely or locally. The formula requirements 62 may be inputted by means of remote management 68 wherein the formula is inputted into the computer system 66 by communicating with the automated dispensing machine 64 and computer system 66 using electronic means (e.g., internet, modem, etc.). Alternatively, the formula requirements 62 for a given liquid concentrate may be inputted by means of local management 70. Local management 70 of the liquid concentrate formula requirements 62 may be may be performed by an operator who manually inputs the formula into the computer system 66. After a desired liquid concentrate is prepared using the automated dispensing machine 58, the liquid concentrate is optionally subjected to a mixing step 72. Mixing of the liquid concentrate yields a uniformly dispersed liquid concentrate final product 74 that is suitable for use in the manufacture of plastic parts.

As shown in FIG. 2, following the preparation of the desired liquid concentrate, a sample of the liquid concentrate may be taken an evaluated for use in the desired application. Sample plastic chips or molded plastic parts may be prepared using the sample of liquid concentrate obtained. If the evaluation process is successful, the liquid concentrate is approved. Commercial quantities of the desired plastic parts may then be produced using the liquid concentrate.

The liquid concentrates prepared in accordance with the processes of the present invention may be used in the production of various types of plastic parts. Any suitable manufacturing method for producing plastic parts may include a liquid concentrate. Suitable processes include, for example, molding, extrusion and vacuum-forming. An in-line metering system will typically be used to add a liquid concentrate to a machine used to manufacture plastic parts where the liquid concentrate is preferably incorporated into a molten plastic resin before a plastic part is formed. Generally, the amount of liquid concentrate in the final plastic part is about 0.1% to about 3.0% by weight. That is, a 100 pounds of plastic produced will contain about 0.1 pounds to about 3.0 pounds of liquid concentrate. Preferably, the amount of liquid concentrate is about 0.5% to about 1.5% by weight. The use of liquid concentrates in which the physical characteristics are carefully controlled in accordance with the present invention becomes more critical and important as the amount of liquid concentrate in the manufactured plastic part decreases.

In another embodiment, the present invention includes a dispensing system for preparing a liquid concentrate. The dispensing system utilizes the process of preparing liquid concentrates of the invention. In particular, the dispensing system includes a plurality of containers and a dispensing machine as described above. Each of the plurality of containers includes a standardized liquid intermediate prepared at a location remote from the dispensing system. The dispensing machine permits the dispensing of a plurality of liquid intermediates to produce a liquid concentrate.

The dispensing machine used in the dispensing system of the invention may be automated using a computer. Preferably, the quantity of each liquid intermediate dispensed by the dispensing machine is controlled according to a predetermined gravimetric formula for the desired liquid concentrate. The gravimetric formula may be contained within the computer such that the quantity of each liquid intermediate is controlled by the computer. Moreover, the computer in the dispensing machine can be used to control the dispensing of the plurality of liquid intermediates to produce the desired liquid concentrate.

EXAMPLE

This example demonstrates the use of the dispensing system of the present invention to prepare liquid concentrates. The liquid concentrates were then used in the molding of colored plastic chips. The dispensing machine 10 was used to prepare a red liquid color concentrate that contains the following standardized liquid intermediates.

|  | weight (%) | weight (g) |
| --- | --- | --- |
| White liquid color intermediate | 8.74% | 79.3592 g |
| Red #1 liquid color intermediate | 63.16% | 573.4928 g |
| Red #2 liquid color intermediate | 12.49% | 113.4102 g |
| Calcium carbonate liquid intermediate | 15.61% | 141.7401 g |

Ten two-pound batches of this red liquid color concentrate were prepared. The standard deviation for amount of each liquid intermediate dispensed was as follows:

|  | Std. Dev. |
| --- | --- |
| White liquid color intermediate | $1.312 \times 10^{-3}$ |
| Red #1 liquid color intermediate | $4.65 \times 10^{-4}$ |
| Red #2 liquid color intermediate | $9.34 \times 10^{-4}$ |
| Calcium carbonate liquid intermediate | $6.67 \times 10^{-5}$ |

Plastic chips were then molded using the two-pound batches of red liquid color concentrate prepared using the dispensing system of the invention. One molded chip was prepared using a portion of each batch of red liquid color concentrate to yield ten plastic chips. The Delta E value was then determined for each plastic chip molded using a Spectra Flash SF500 (Datacolor International, Charlotte, N.C.) with Color Tools QC Software, Version 1.3R4 (Datacolor International, Charlotte, N.C.). The standard deviation of Delta E among the ten plastic chips was $6.9314 \times 10^{-2}$.

From the foregoing example, it can be seen that the process and dispensing system of the present invention is highly accurate and results in the superior repeatability in the production of liquid concentrates. Moreover, the molded plastic parts produced using liquid concentrates produced in accordance with the present invention should have substantially identical color characteristics and meet very tight tolerances for batch-to-batch consistency.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. The term "including" means "including, but not limited to." Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process for preparing a liquid concentrate for use in the manufacture of plastic parts comprising:
   (a) preparing one or more liquid intermediates, wherein the liquid intermediates comprise a liquid vehicle and at least one additive;
   (b) standardizing the liquid intermediates;
   (c) transferring the standardized liquid intermediates to a remote location; and
   (d) dispensing the liquid intermediates to produce a liquid concentrate, wherein the quantity of each liquid intermediate dispensed is controlled according to a predetermined formula for the liquid concentrate, wherein the quantity of each liquid intermediate dispensed is controlled by a computer that contains the predetermined formula, wherein the dispensing of the liquid intermediates in step (d) is controlled by a computer, and wherein the liquid intermediates are dispensed in order of heaviest intermediate on a weight basis to smallest intermiate on a weight basis.

2. The process according to claim 1, wherein the formula is gravimetric.

3. The process according to claim 2, wherein the gravimetric formula is inputted into the computer locally.

4. The process according to claim 2, wherein the gravimetric formula is inputted into the computer remotely.

5. The process according to claim 1, wherein the additive is selected from the group consisting of a colorant, an optical brightener, a laser marking additive, an anti-settling agent, a blowing agent, a release agent, a light stabilizer, and mixtures thereof.

6. The process according to claim 1, wherein at least one of the liquid intermediates is agitated after step (c) and before step (d).

7. The process according to claim 6, wherein the liquid intermediate is agitated by recirculating the intermediate.

8. The process according to claim 7, wherein the recirculation of the liquid intermediate is computer controlled.

9. The process according to claim 1, wherein the formula is prepared prior to step (d) based on additive requirements received from the user of the liquid concentrate.

10. The process according to claim 1, wherein the additive is selected from the group consisting of a colorant, an optical brightener, a laser-marking additive, an anti-settling agent, a blowing agent, a release agent, a light stabilizer, and mixtures thereof.

11. A process for preparing a liquid concentrate for use in the manufacture of plastic parts comprising:
   (a) providing one or more liquid intermediates, wherein the liquid intermediates comprise a liquid vehicle and at least one additive, wherein the liquid intermediates are standardized, and wherein the liquid intermediates have been prepared remotely; and
   (b) dispensing the liquid intermediates to produce a liquid concentrate, wherein the quantity of each liquid intermediate dispensed is controlled according to a predetermined formula for the liquid concentrate, wherein the dispensing of the liquid intermdiates in step (b) is controlled by a computer, and wherein the liquid intermediates are dispensed in order of heaviest liquid intermediate on a weight basis to smallest liquid intermediate on a weight basis.

12. The process according to claim 11, wherein the quantity of each liquid intermediate is controlled by a computer that contains the predetermined formula.

13. The process according to claim 12, wherein the formula is gravimetric.

14. The process according to claim 13, wherein the gravimetric formula is inputted into the computer locally.

15. The process according to claim 13, wherein the gravimetric formula is inputted into the computer remotely.

16. The process according to claim 11, wherein at least one of the liquid intermediates is agitated after step (a) and before step (b).

17. The process according to claim 16, wherein the liquid intermediate is agitated by recirculating the liquid intermediate.

18. The process according to claim 17, wherein the recirculation of the liquid intermediate is controlled by a computer.

19. The process according to claim 11, wherein the formula is prepared prior to step (b) based on additive requirements received from the user of the liquid concentrate or determined as part of the formula development process.

20. An automated dispensing system for preparing a liquid concentrate for use in the manufacture of plastic parts comprising:
  (a) a plurality of containers each containing a standardized liquid intermediate prepared at a location remote from the dispensing system;
  (b) a computer for selecting a predetermined gravimetric formula for a desired liquid concentrate; and
  (c) a dispensing machine for dispensing a plurality of liquid intermediates to produce the desired liquid concentrate, wherein the quantity of each liquid intermediate is controlled by a computer that contains the predetermined gravimetric formula, and wherein the dispensing of the liquid intermediates is controlled by the computer, wherein the gravimetric formula for the liquid concentrate is generated by an operator using one or more of the liquid intermediates identified in an intermediate library stored in the computer, wherein the computer further tracks the inventory of liquid intermediates dispensed, and determines if a sufficient quantity of each liquid intermediate in the predetermined gravimetric formula is available for dispensing pursuant to step (c), and wherein the computer further bills the user for the liquid concentrates dispensed automatically at specified intervals.

21. The dispensing system according to claim 20, wherein the predetermined gravimetric formula for the liquid concentrate is selected by the operator of the dispensing machine from a concentrate formula library stored in the computer.

* * * * *